Figure 1:
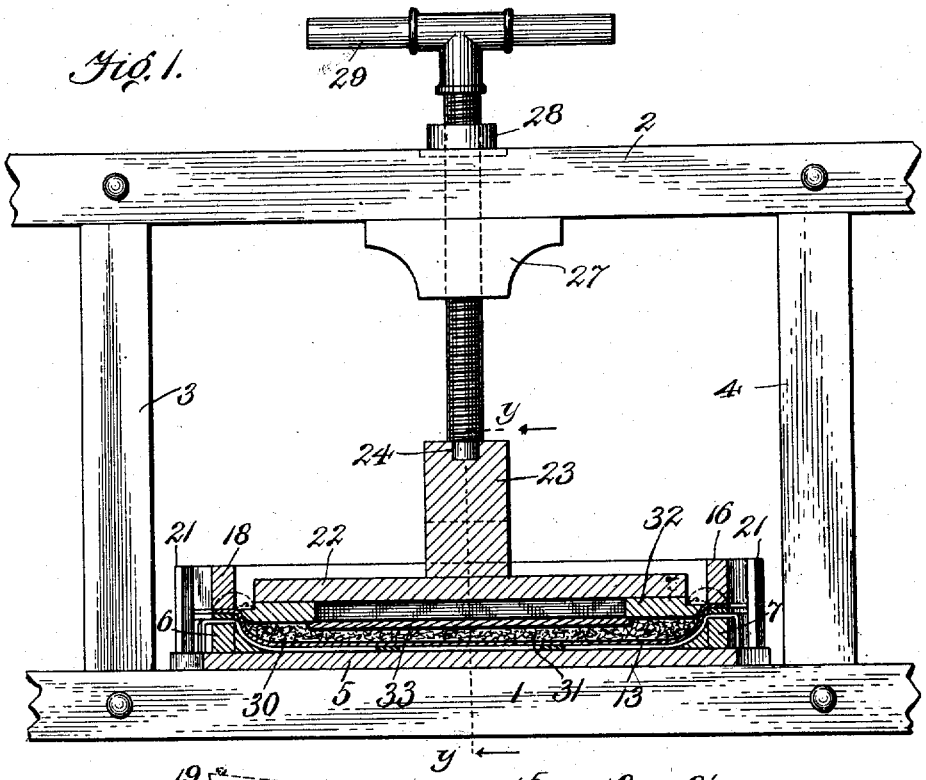

E. E. PECK.

APPARATUS FOR THE MANUFACTURE OF SEATS AND BACKS FOR CHAIRS AND LIKE FURNITURE.

APPLICATION FILED APR. 9, 1917.

Reissued June 26, 1917.

14,322.

2 SHEETS—SHEET 1.

Inventor:
Edmund E. Peck,
by W. J. Duvall,
Attorney.

THE NORRIS PETERS CO., PHOTO-LITHO., WASHINGTON, D. C.

E. E. PECK.

APPARATUS FOR THE MANUFACTURE OF SEATS AND BACKS FOR CHAIRS AND LIKE FURNITURE.

APPLICATION FILED APR. 9, 1917.

Reissued June 26, 1917. 14,322.

2 SHEETS—SHEET 2.

Inventor:

Edmund E. Peck, by M. Duvall

Attorney.

THE NORRIS PETERS CO., PHOTO-LITHO., WASHINGTON, D. C.

UNITED STATES PATENT OFFICE.

EDMUND E. PECK, OF GRAND VIEW ON HUDSON, NEW YORK, ASSIGNOR, BY MESNE ASSIGNMENTS, TO S. KARPEN & BROS., OF CHICAGO, ILLINOIS, A CORPORATION OF WEST VIRGINIA.

APPARATUS FOR THE MANUFACTURE OF SEATS AND BACKS FOR CHAIRS AND LIKE FURNITURE.

14,322. Specification of Reissued Letters Patent. Reissued June 26, 1917.

Original No. 1,140,846, dated May 25, 1915, Serial No. 834,065, filed April 24, 1914. Application for reissue filed April 9, 1917. Serial No. 160,856.

*To all whom it may concern:*

Be it known that I, EDMUND E. PECK, a citizen of the United States, residing at Grand View on Hudson, in the county of Rockland and State of New York, have invented an Improvement in Apparatus for the Manufacture of Seats and Backs for Chairs and like Furniture, of which the following is a specification.

My invention relates to apparatus for making cushioned seats or backs provided with covers of flexible material, and is particularly adapted for making seats for chairs, but it may be readily employed in making seats and backs for stools, lounges, sofas, and like articles.

I am aware that apparatus has heretofore been employed in the manufacture of chair seats, to tightly press a leather cover and a padding of cushioning material against the face of a wooden bottom and hold the leather taut, while the edges are secured to the bottom. In such apparatus, however, the leather cover is held against movement by fixed clamps and sharp pins, which puncture the leather, and the cover is pressed directly against a surface of wood while the tightly clamped edges are subjected to undue strain and are often badly torn by the sharp pins.

The object of my present invention is to overcome these difficulties, and in carrying out the same I provide a shaper or matrix of suitable material and internal shape and having an upholstering-cover support of flexible, yielding, and preferably elastic material stretched across its top, upon which the flexible upholstering-cover is laid. I also provide a removable clamping-frame to hold the edges of the flexible upholstering-cover against the top edges of the matrix with sufficient tension to prevent undue slipping of the upholstering-cover yet at the same time to allow a certain degree of movement under pressure to prevent tearing the material and to permit the flexible upholstering-cover to stretch gradually, thereby assuring a smooth, even and correct formation of the cushioned seat without danger of injury to its edges.

The details of construction are hereinafter particularly described.

Figure 2:
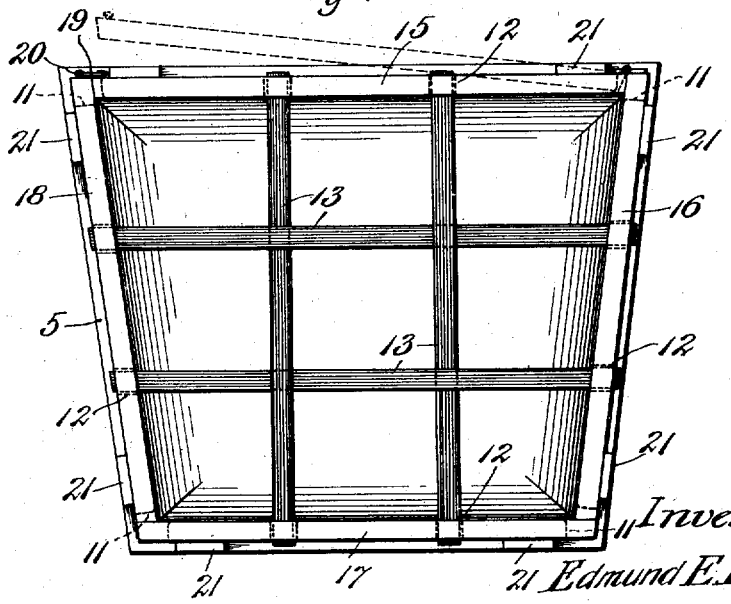
Figure 3:
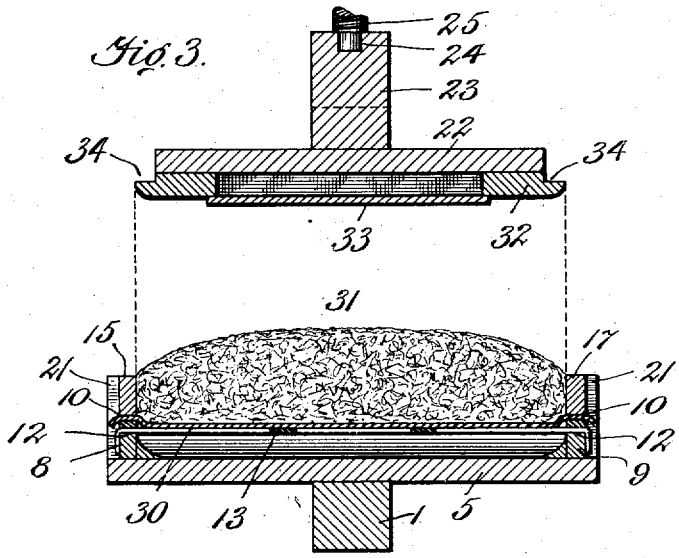
Figure 4:
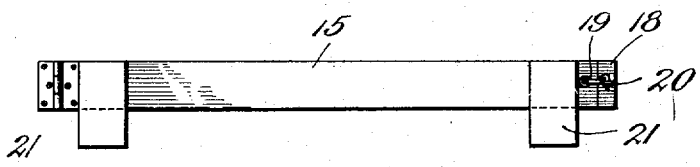
Figure 5:
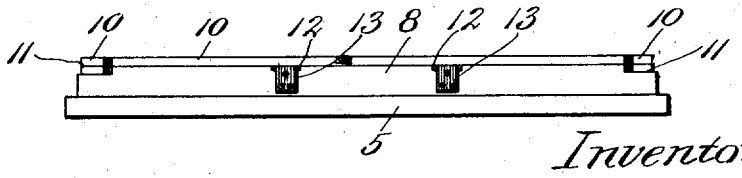

In the accompanying drawings: Figure 1 is a front view, partly in elevation and partly in section, showing my invention with the seat therein and illustrating the parts in the position occupied when the seat has been pressed to shape. Fig. 2 is a plan view of the matrix with the clamping-frame in position. Fig. 3 is a section on the line *y*, *y*, of Fig. 1. Fig. 4 is a front elevation of the clamping-frame detached, and Fig. 5 is a front elevation of the matrix, separated from the other parts.

1, 2, 3 and 4 represent the supporting-frame.

The shaper or matrix rests upon the horizontal member 1 of the frame. This matrix is to be made of an internal shape according to the shape of the seat or back desired to be constructed, and it may be of any suitable material, preferably of wood. It consists of an exteriorly flat bottom 5, side walls 6 and 7, front wall 8, and back wall 9. The bottom 5 preferably extends slightly beyond the exterior of these walls. On the interior of the matrix the side walls and front and back walls converge or are curved toward the center of the bottom 5. The upper edges of the walls 6, 7, 8, 9, of the matrix are preferably provided with pairs of opposite transverse recesses 12, to receive the ends of yielding strips 13, stretched across the top of the matrix from front to back and from side to side, thus crossing and interlacing each other, their ends, in this instance, being turned over said walls and secured to the outer surfaces thereof by tacks or in any suitable manner.

Binding-strips 10, of wood or other suitable material, are placed on top of the walls 6, 7, 8, 9, of the matrix, over the flexible yielding strips, and are secured in position by tacks. These binding-strips 10 extend approximately the distance of the interior of the matrix, but do not meet each other, thereby leaving a space 11 at each corner at the top of the matrix.

Instead of employing, for the purpose of supporting the upholstering-cover, separate strips 13 as shown, a single sheet of suitable flexible material may be substituted. The strips 13, or the sheet, as the case may be, are preferably formed of elastic material, such as rubber or rubber-fabric, but in any event, must be capable of yielding. In case a single sheet of material is employed, the recesses 12 might be unnecessary, as the material might be stretched over the smooth upper surfaces of the walls of the matrix. Neither are said recesses 12 absolutely necessary where a plurality of strips 13 are employed, but I prefer to provide them, so that the upper surfaces of the strips will not have too great frictional contact with the binding-strips 10.

I provide a clamping-frame of a shape corresponding to that of the wall of the matrix. This frame comprises the wall-members 15, 16, 17 and 18, three of these members being rigidly secured together at their meeting-ends, while the fourth member is hinged at one end to the end of one of the other members, the free end of the hinged member being provided with a hook 19 to engage an eye 20 on the end of one of the fixed members.

21 indicates spaced cleats secured to the outer surface of the wall-members and extending below the bottoms thereof, so that when the clamping-frame is placed upon the matrix these cleats lie against the outer surfaces of the walls of the matrix and hold the clamping-frame in its proper relative position.

25 indicates a feed-screw having a lower reduced bearing-end, which fits into a bearing-socket 24, on the shank 23, of the presser-block.

The member 2 of the supporting-frame is provided with a vertical central opening, and on its underside a boss 27, having a threaded opening in line with that of the member 2.

28 is a bushing in the upper part of the opening in the member 2, which bushing is interiorly screw-threaded. The feed-screw 25 operates within the threaded holes in the bushing 28 and boss 27.

29 is a hand-bar by which the feed-screw 25 is turned.

30 indicates the upholstering-cover for the seat, which cover is of leather or other suitable flexible material.

31 represents the cushioning material or stuffing which may be of any suitable character.

32 represents the seat-bottom, which is preferably of wood.

The seat may be solid, but I prefer that the center part be cut away to lighten it, and that this opening be covered on the top (or that part coming in contact with the cushioning material) by a comparatively thin piece of board or other suitable material 33, as shown in Figs. 1 and 3. I also prefer that the bottom 32 be provided with flanges 34, to receive the edges of the flexible upholstering-cover 30 when they are folded over as shown in dotted lines in Fig. 1.

When a seat is about to be made, the matrix is laid upon the supporting-member 1, between the uprights 3 and 4, and in vertical alinement with the feed-screw 25. The flexible upholstering-cover 30 is then placed over the top of the matrix, being supported in position by the strips 13. The clamping-frame is then placed in position, thus clamping the edges of the upholstering-cover upon the upper surfaces of the binding-strips 10, and forming a receptacle for the cushioning material 31, which is then laid upon the upholstering-cover. This is fully illustrated in Fig. 3. The seat-bottom 32 is then placed upon the cushioning material and the presser-block 22 is placed upon the bottom 32, when by turning the feed-screw 25, the parts are pressed into the position shown in Fig. 1. During this operation the upholstering-cover is gradually stretched as the supporting-strips 13 upon which it rests yield, thereby assuring a smooth and perfectly formed upholstered cushioned seat, without danger of tearing the edges of the cover, as these edges are only clamped by the clamping-frame with sufficient tension to hold them properly in position while the pressure is applied. Now by releasing the hook 19 on the clamping-frame, this frame may be withdrawn from the apparatus and laid aside, which gives free access for the workmen to fold over the edges of the flexible upholstering-cover upon the flanges 34 of the seat-bottom where they are secured in any suitable manner, preferably by tacks. The spaces 11 at the corners of the matrix allow for cutting the upholstering-cover at such points to facilitate the folding of its edges.

In making chair-backs by this apparatus, it is preferable that the edges of the upholstering-cover be left without folding, and that glue or other suitable adhesive substance be applied to such edges so that the back-board may be pressed thereon, thus securing the cushioned back thereto.

It will be understood that by turning the feed-screw 25 in the reverse direction, the presser-block 22 may be removed and the upholstered chair-seat withdrawn from the matrix in a finished condition, when the operation may be repeated.

The supporting-frame may be of any desired length so that a number of these devices may be arranged thereon adjacent each other, or separated only by the uprights 3 and 4.

I claim as my invention:

1. In an apparatus of the character described, the combination of a matrix, a flexible yielding upholstering-cover support arranged thereover, means for securing it in position, a pressing element, and means for raising and lowering said pressing element.

2. In an apparatus of the character described, the combination of a matrix, a flexible yielding upholstering-cover support arranged thereover, a clamping-frame agreeing in contour with the matrix and seated upon the cover-support, a pressing element, and means for raising and lowering said pressing element.

3. In an apparatus of the character described, the combination of a matrix, a flexible yielding upholstering-cover support arranged thereover and comprising a plurality of oppositely-disposed strips connected at their ends to the walls of the matrix, a pressing element, and means for raising and lowering said pressing element.

4. In an apparatus of the character described, the combination of a matrix, a flexible yielding upholstering-cover support arranged thereover and comprising a plurality of oppositely disposed strips connected to the walls of the matrix, binding-strips arranged thereover, a presser-frame mounted on the latter and conforming to the contour of the matrix, a pressing element, and means for raising and lower the pressing element.

5. In an apparatus of the character described, the combination of a matrix, a flexible yielding upholstering-cover support arranged thereover, binding-strips secured to the upper edges of the wall of the matrix and arranged over the cover-support and terminating short of their meeting-ends to form recesses, a presser-frame, a pressing element, and means for operating said pressing element.

6. In an apparatus of the character described, the combination of a matrix, an upholstering-cover support of elastic material extended across the top thereof and secured thereto, a clamping-frame, a presser-block, and means for operating said block.

7. In an apparatus of the character described, the combination of a matrix, an upholstering-cover support comprising a plurality of longitudinal and transverse strips of elastic material stretched across the top of said matrix with their ends secured thereto, a clamping-frame, a presser-block, and means for operating said block.

8. In an apparatus of the character described, the combination of a matrix, an upholstering-cover support comprising a plurality of elastic strips stretched across the top of said matrix and secured thereto, a clamping-frame fitting the top of said matrix, means for holding said clamping-frame in position, said clamping-frame being adapted for clamping the edges of a flexible upholstering-cover between it and the top of said matrix, a presser-block, and means for operating said block.

In testimony whereof I have signed my name to this specification.

EDMUND E. PECK.

Copies of this patent may be obtained for five cents each, by addressing the "Commissioner of Patents, Washington, D. C."